United States Patent
Kozo et al.

Patent Number: 5,619,356
Date of Patent: Apr. 8, 1997

[54] REFLECTIVE LIQUID CRYSTAL DISPLAY DEVICE HAVING A COMPENSATOR WITH A RETARDATION VALUE BETWEEN 0.15 μM AND 0.38 μM AND A SINGLE POLARIZER

[75] Inventors: Nakamura Kozo, Kashiba; Mitsui Seiichi, Nara; Fukuda Ichiro, Kanazawa, all of Japan

[73] Assignee: Sharp Kabushiki Kaisha, Osaka, Japan

[21] Appl. No.: 307,913

[22] Filed: Sep. 16, 1994

[30] Foreign Application Priority Data

Sep. 16, 1993 [JP] Japan ................. 5-230581

[51] Int. Cl.$^6$ .................................. G02F 1/1335
[52] U.S. Cl. ................ 349/99; 349/70; 349/102; 349/117
[58] Field of Search .................. 359/73, 70, 74, 359/79, 102, 63

[56] References Cited

U.S. PATENT DOCUMENTS

| | | | |
|---|---|---|---|
| 4,643,530 | 2/1987 | Yamazaki | 359/63 |
| 4,697,884 | 10/1987 | Amstutz et al. | 359/63 |
| 5,119,220 | 6/1992 | Narita et al. | 359/73 |
| 5,166,817 | 11/1992 | Ota et al. | 359/73 |
| 5,204,765 | 4/1993 | Mitsui et al. | 359/70 |
| 5,220,447 | 6/1993 | Yokokura et al. | 359/73 |
| 5,369,513 | 11/1994 | Akatsuka et al. | 359/73 |

FOREIGN PATENT DOCUMENTS

| | | |
|---|---|---|
| 60-107020 | 6/1985 | Japan . |
| 1-188828 | 7/1989 | Japan . |
| 3-116014 | 5/1991 | Japan . |
| 4-97121 | 3/1992 | Japan . |
| 4-289818 | 10/1992 | Japan . |

*Primary Examiner*—William L. Sikes
*Assistant Examiner*—James Dudek
*Attorney, Agent, or Firm*—David G. Conlin; Brian L. Michaelis

[57] ABSTRACT

A reflective liquid crystal display device including: a first substrate; a second substrate; a liquid crystal layer interposed between the first substrate and the second substrate; electrodes for applying a voltage to the liquid crystal layer; a polarizing plate provided on a side of the liquid crystal layer on which the first substrate is provided; a reflective member provided on a side of the liquid crystal layer on which the second substrate is provided; and an optical compensation member provided between the polarizing plate and the liquid crystal layer, wherein the liquid crystal layer has a twist angle in a range of 220° to 260° and a retardation value of 0.5 μm to 0.8 μm, the optical compensation member has a retardation value in a range of 0.15 μm to 0.38 μm, and an angle β which is formed between a polarization axis direction of the polarizing plate and an alignment direction of liquid crystal molecules in the liquid crystal layer on a side of the polarizing plate, and an angle γ which is formed between an axis direction of a slower optical axis of the optical compensation member and an alignment direction of the liquid crystal molecules, satisfy one of following expressions (A) and (B) when m is an integer:

$$0.5\beta+45° \ m-15° \leq \gamma \leq 0.5\beta+45° \ m+5° \quad (A)$$

$$0.5\beta+45° \ m+7.5° \leq \gamma \leq 0.5\beta+45° \ m+27.5° \quad (B)$$

is disclosed.

29 Claims, 15 Drawing Sheets

FIG. 9
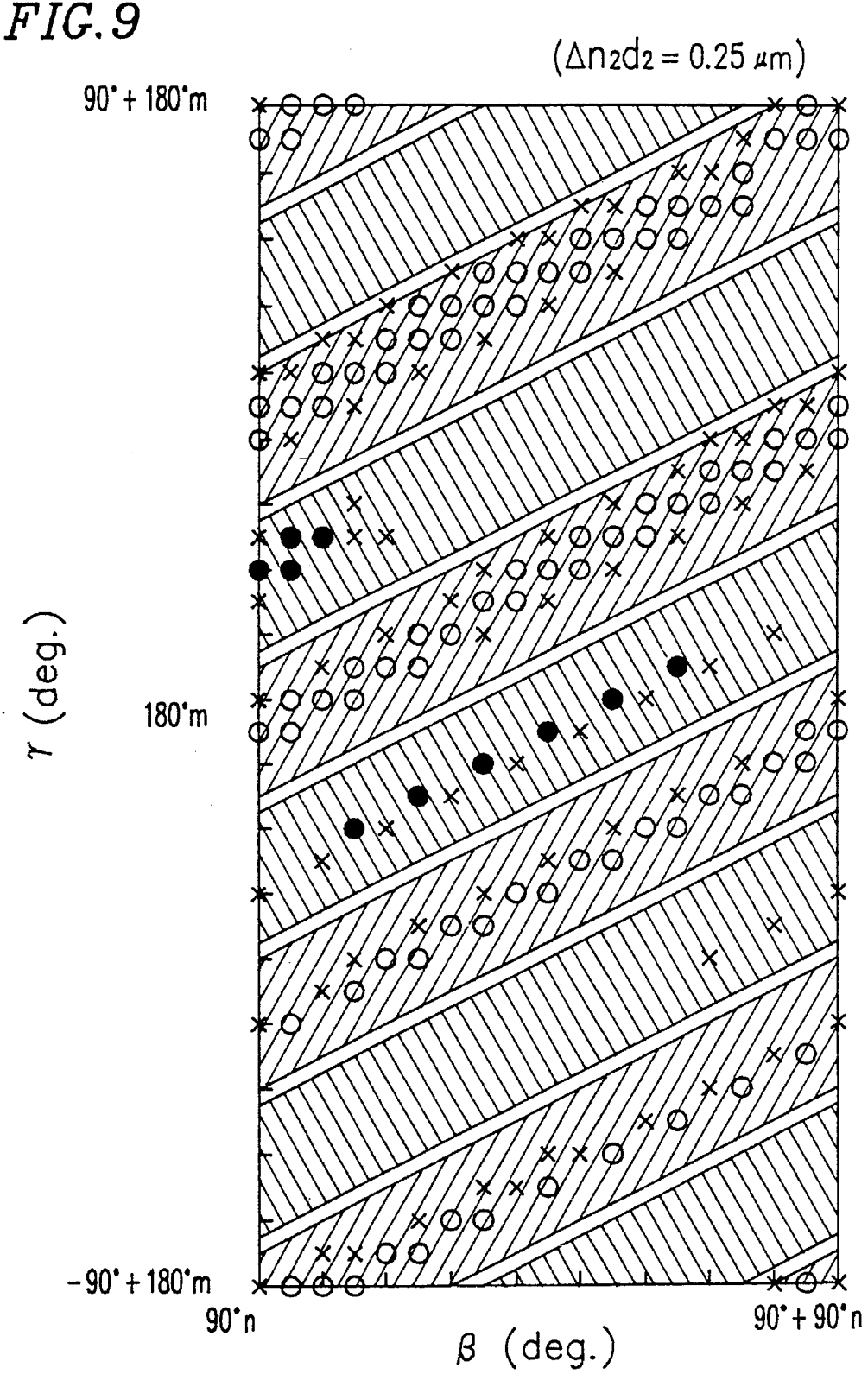
($\Delta n_2 d_2 = 0.25 \mu m$)
 Normally white mode   Normally black mode

REFLECTIVE LIQUID CRYSTAL DISPLAY DEVICE HAVING A COMPENSATOR WITH A RETARDATION VALUE BETWEEN 0.15 µM AND 0.38 µM AND A SINGLE POLARIZER

BACKGROUND OF THE INVENTION

1. Field of the Invention

The present invention relates to a liquid crystal display device, and more specifically, to a reflective liquid crystal display device which is used for OA (office automation) apparatuses such as word processors and notebook type personal computers, various image display apparatuses, and apparatuses for playing games.

2. Description of the Related Art

In recent years, the application of a liquid crystal display device (LCD) to a word processor, a lap-top personal computer, a portable television set called a "pocket TV", or the like has been rapidly developed. Conventionally, a twisted nematic (TN) mode and a super-twisted nematic (STN) mode are employed in such an LCD.

In the above-mentioned TN mode, a monochrome display (a black and white display) is conducted by using the optical characteristics of a liquid crystal display device (liquid crystal panel) interposed between a pair of polarizing plates, i.e. the optical rotatory characteristics when no voltage is applied and the optical non-rotatory characteristics when a voltage is applied.

In the STN mode, which is widely used for a display mode of a word processor, a twist angle of liquid crystal layer is set to be in the range of 180° to 270° in a liquid crystal panel of a similar structure to that in the TN mode. According to the STN mode, the twist angle of liquid crystal layer is increased by 90° or more and the setting angle of the polarizing plates is optimized, thereby realizing an electro-optic characteristics with a steep threshold characteristic which reflect the rapid change of the orientation of liquid crystal molecules with an application of a voltage on the change of the birefringence of the liquid crystal layer. Since the STN mode has a steep threshold characteristic, the STN mode is suitable for simple matrix driving.

In the STN mode, the birefringence of the liquid crystal layer causes the background of the display to be colored in yellowish green or dark blue. In order to improve this drawback, an LCD is proposed in which a monochrome display is realized by means of color compensation which is conducted by attaching an optical compensation panel or a phase plate formed by a polymer such as polycarbonate to the liquid crystal panel of the STN mode. An LCD of such a structure, so-called "paper white LCD", is currently on the market. The detailed operational principle in the TN mode and STN mode is already well known in the art and is disclosed in "Liquid Crystal Device Handbook", Ed. by Japan Society for Promotion of Science, Committee 142, 1989, pp. 329–352.

In such an LCD of the TN or STN mode, however, if the LCD is used as a reflective LCD, the obtained display is undesirably darkened, because two polarizing plates interposing a liquid crystal panel are used. In order to solve the problem, reflective LCDs of the STN mode with a single polarizing plate are proposed in Japanese Laid-Open Patent Publication Nos. 4-97121 and 4-289818.

However, in the proposed LCDs mentioned above, none of the means to solve the following problems is mentioned: the prevention of the coloring of the displayed color during a gray-scale display, the retardation value of the liquid crystal layer, the retardation value of the optical compensation plate (phase plate), and the related position of the polarizing plate and the optical compensation plate. Consequently, in such LCDs, the prevention of the coloring of the displayed color cannot be realized during a gray-scale display.

SUMMARY OF THE INVENTION

The reflective liquid crystal display device of the present invention includes: a first substrate; a second substrate; a liquid crystal layer interposed between the first substrate and the second substrate; electrodes for applying a voltage to the liquid crystal layer; a polarizing plate provided on a side of the liquid crystal layer on which the first substrate is provided; a reflective member provided on a side of the liquid crystal layer on which the second substrate is provided; and an optical compensation member provided between the polarizing plate and the liquid crystal layer, wherein the liquid crystal layer has a twist angle in a range of 220° to 260° and a retardation value of 0.5 µm to 0.8 µm, the optical compensation member has a retardation value in a range of 0.15 µm to 0.38 µm, and an angle $\beta$ which is formed between a polarization axis direction of the polarizing plate and an alignment direction of liquid crystal molecules in the liquid crystal layer on a side of the polarizing plate, and an angle $\gamma$ which is formed between an axis direction of a slower optical axis of the optical compensation member and an alignment direction of the liquid crystal molecules, satisfy one of following expressions (A) and (B) when m is an integer:

$$0.5\beta + 45° \, m - 15° \leq \gamma \leq 0.5\beta + 45° \, m + 5° \quad \text{(A)}$$

$$0.5\beta + 45° \, m + 7.5° \leq \gamma \leq 0.5\beta + 45° \, m + 27.5° \quad \text{(B)}$$

In one embodiment of the present invention, the reflective member is provided between the first substrate and the liquid crystal layer and has a reflective surface on a side of the liquid crystal layer.

In another embodiment of the present invention, the reflective member has a ruggedness the levels of which are different by 0.1 µm to 1.5 µm.

In still another embodiment of the present invention, the reflective film is a conductive reflective film and functions as a part of the electrodes.

In still another embodiment of the present invention, the liquid crystal display device further includes a transparent planation layer formed on the reflective member and planating the ruggedness of the reflective member, and a transparent electrode formed on the planation layer and functioning as a part of the electrodes.

In still another embodiment of the present invention, the liquid crystal display device further includes a color filter layer on a side of the liquid crystal layer on which the first substrate is provided.

In another aspect of the present invention, the reflective liquid crystal display device includes: a first substrate; a second substrate; a liquid crystal layer interposed between the first substrate and the second substrate; electrodes for applying a voltage to the liquid crystal layer; a polarizing plate provided on a side of the liquid crystal layer on which the first substrate is provided; a reflective member provided on a side of the liquid crystal layer on which the second substrate is provided; and an optical compensation member provided between the polarizing plate and the liquid crystal layer, wherein the liquid crystal layer has a twist angle in a range of 220° to 260° and a retardation value in a range of 0.5 µm to 0.8 µm, the optical compensation member has a retardation value in a range of 0.43 µm to 0.55 µm, and an angle β which is formed between a polarization axis direction of the polarizing plate and an alignment direction of liquid crystal molecules in the liquid crystal layer on a side of the polarizing plate satisfies one of following expressions (C) and (D) when m is an integer:

$$70°+90° n \leq \beta \leq 105°+90° n \quad (C)$$

$$20°+90° n \leq \beta \leq 50°+90° n \quad (D)$$

In still another aspect of the present invention, the reflective liquid crystal display device includes: a first substrate; a second substrate; a liquid crystal layer interposed between the first substrate and the second substrate; electrodes for applying a voltage to the liquid crystal layer; a polarizing plate provided on a side of the liquid crystal layer on which the first substrate is provided; a reflective member provided on a side of the liquid crystal layer on which the second substrate is provided; and an optical compensation member provided between the polarizing plate and the liquid crystal layer, wherein the liquid crystal layer has a twist angle in a range of 220° to 260° and a retardation value in a range of 0.5 µm to 0.8 µm, the optical compensation member has a retardation value in a range of 0 µm to 0.15 µm, and an angle β which is formed between a polarization axis direction of the polarizing plate and an alignment direction of liquid crystal molecules in the liquid crystal layer on a side of the polarizing plate, and an angle γ which is formed between an axis direction of a slower optical axis of the optical compensation member and an alignment direction of the liquid crystal molecules, satisfy one of following expressions (E), (F) and (G) when m and n are integers:

$$65°+90° n \leq \beta \leq 110°+90° n, \text{ and } -20°+90° m \leq \gamma \leq 10°+90° m \quad (E)$$

$$30°+90° n \leq \beta \leq 70°+90° n, \text{ and } -75°+180° m \leq \gamma \leq -45°+180° m \quad (F)$$

$$80°+90° n \leq \beta \leq 120°+90° n, \text{ and } 20°+180° m \leq \gamma \leq 50°+180° m \quad (G)$$

In sill another aspect of the present invention, the reflective liquid crystal display device includes: a first substrate; a second substrate; a liquid crystal layer interposed between the first substrate and the second substrate; electrodes for applying a voltage to the liquid crystal layer; a polarizing plate provided on a side of the liquid crystal layer on which the first substrate is provided; a reflective member provided on a side of the liquid crystal layer on which the second substrate is provided; and an optical compensation member provided between the polarizing plate and the liquid crystal layer, wherein the liquid crystal layer has a twist angle in a range of 220° to 260° and a retardation value in a range of 0.5 µm to 0.8 µm, the optical compensation member has a retardation value in a range of 0.38 µm to 0.43 µm, and an angle β which is formed between a polarization axis direction of the polarizing plate and an alignment direction of liquid crystal molecules in the liquid crystal layer on a side of the polarizing plate, and an angle γ which is formed between an axis direction of a slower optical axis of the optical compensation member and an alignment direction of the liquid crystal molecules, satisfy one of following expressions (H), (I) and (J) when m and n are integers:

$$50°+90° n \leq \beta \leq 110°+90° n, \text{ and } -20°+90° m \leq \gamma \leq 10°+90° m \quad (H)$$

$$30°+90° n \leq \beta \leq 80°+90° n, \text{ and } 20°+180° m \leq \gamma \leq 60°+180° m \quad (I)$$

$$70°+90° n \leq \beta \leq 120°+90° n, \text{ and } -75°+180° m \leq \gamma \leq -50°+180° m \quad (J)$$

Thus, the invention described herein makes possible an advantage of providing a liquid crystal display device in which a brighter display with a high contrast can be obtained, and the coloring can be eliminated even when a gray-scale display is conducted.

This and other advantages of the present invention will become apparent to those skilled in the art upon reading and understanding the following detailed description with reference to the accompanying figures.

BRIEF DESCRIPTION OF THE DRAWINGS

FIG. 9 is a view showing a display characteristic of the liquid crystal display device of an example according to the present invention when the retardation value $\Delta n_2 d_2$ is 0.25 µm.

DESCRIPTION OF THE PREFERRED EMBODIMENTS

Hereinafter, examples of the present invention will be described in more detail with reference to the accompanying drawings.

EXAMPLE 1

Figure 1:
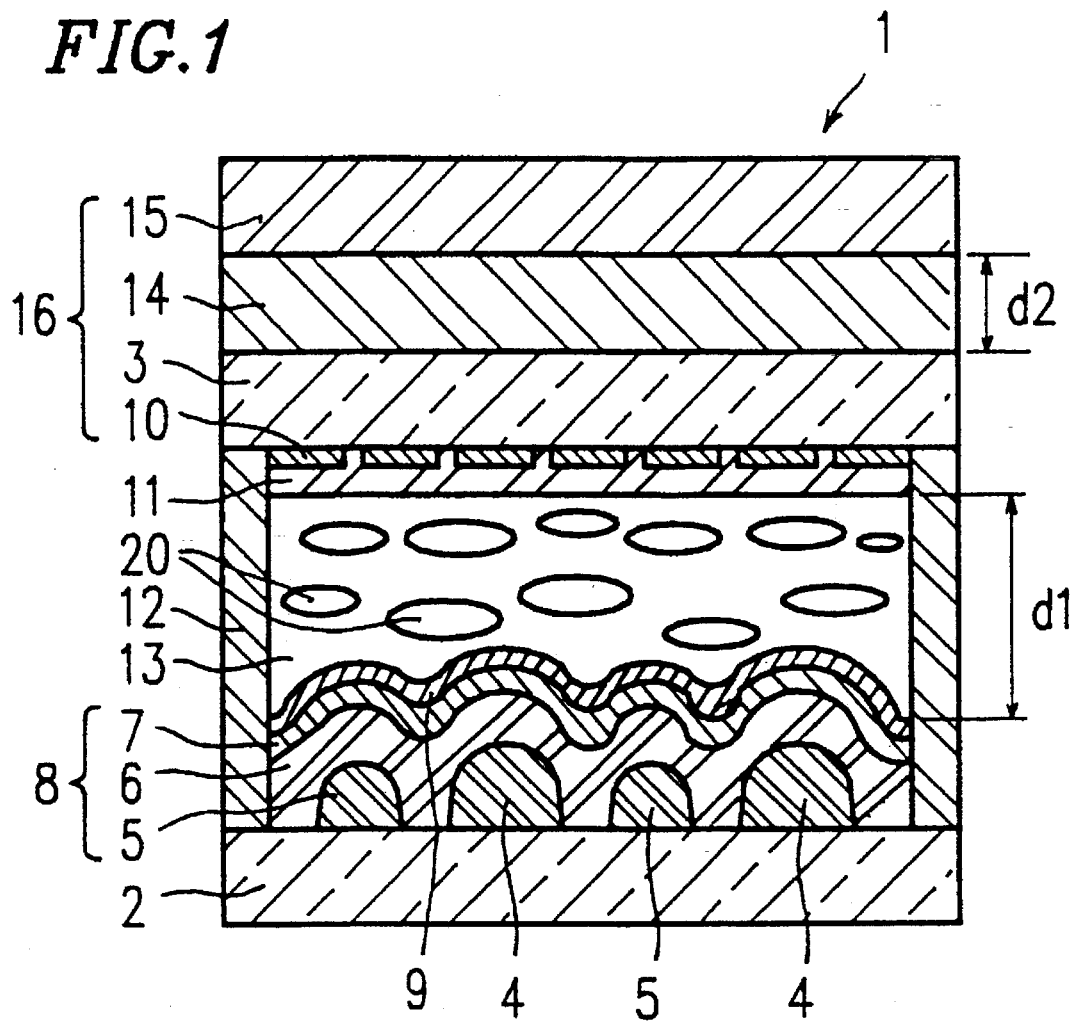
FIG. 1 is a cross sectional view of a liquid crystal display device of an example according to the present invention.

FIG. 1 shows a cross-sectional view of a liquid crystal display device according to a first example of the present invention. The liquid crystal display device 1 in which a liquid crystal layer 13 is interposed between a reflective plate 8 and an upper substrate 16.

Figure 2:
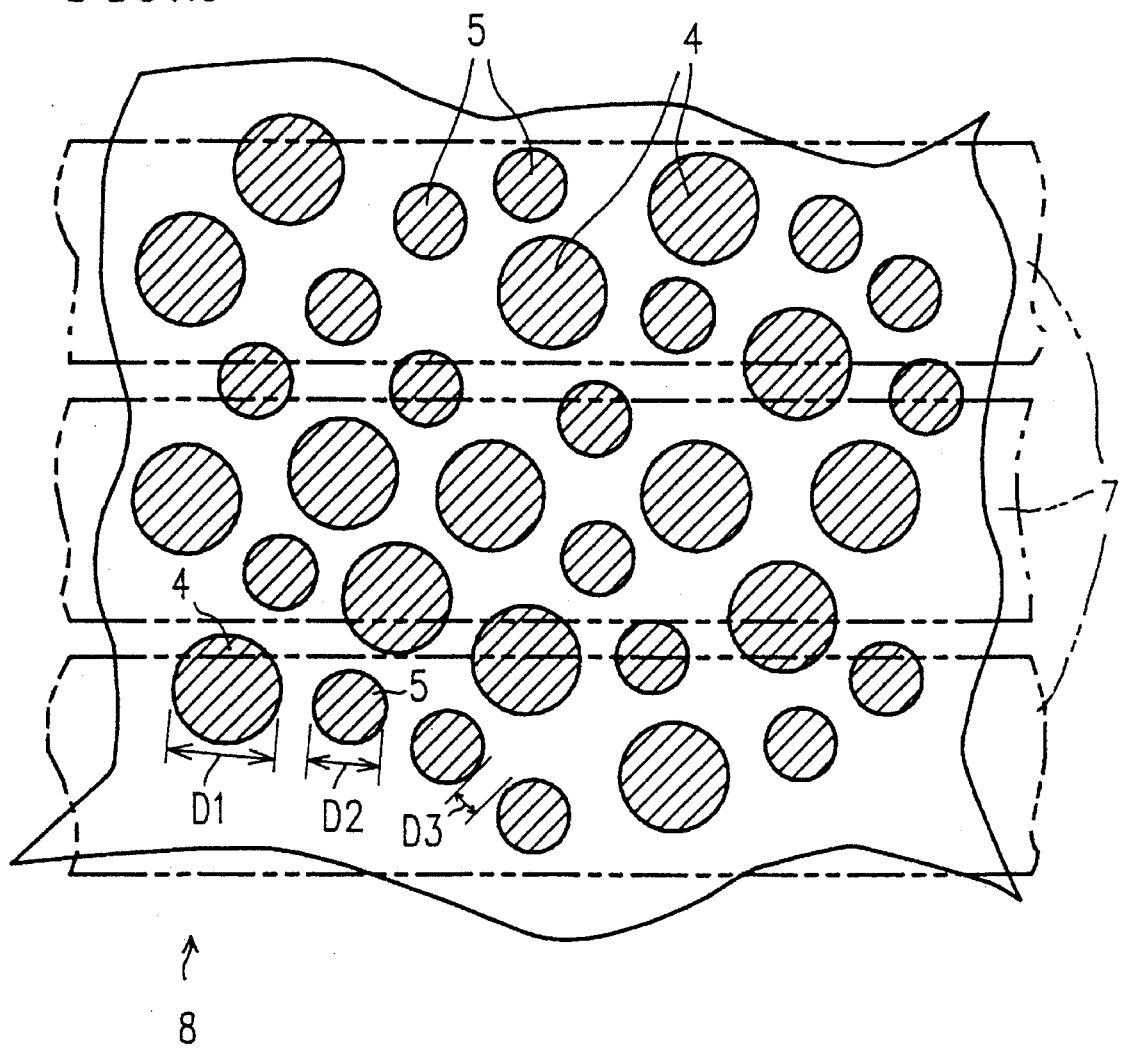
FIG. 2 is a plan view showing a reflective plate 8 of the liquid crystal display device of FIG. 1.

A large number of larger projections 4 and smaller projections 5 made of a synthetic resin material are formed on a surface of a glass substrate 2 facing the liquid crystal layer 13. Referring briefly to FIG. 2, the diameter D1 of the bottom of the larger projections 4 is set to be 10 µm and the diameter D2 of the bottom of the smaller projections 5 is set to be 5 µm, and the gap D3 between adjacent projections is set to be 2 µm or more. Over the projections 4 and 5, an overcoating film 6 is formed so as to coat both projections 4 and 5 and fill the concave portions between adjacent projections. Furthermore, reflective films 7 made of a metal material such as aluminum, nickel, chrome, silver or gold and an alignment film 9 are formed in this order over the overcoating film 6. As is shown in FIG. 2, strips of reflective films 7 are arranged in several rows, which also operate as reflective electrodes. As is described above, the projections 4 and 5 on the glass substrate 2, the overcoating film 6, and the reflective films 7 constitute the reflective plate 8.

On a surface of a glass substrate 3 of the upper substrate 16 facing the liquid crystal layer 13, strips of transparent electrodes 10 made of indium tin oxide (ITO) are formed in several rows in a direction perpendicular to the extending direction of the reflective films 7. Over the glass substrate 3 on which the transparent electrodes 10 are formed, an alignment film 11 is further formed. On the surface of the glass substrate 3 opposite to the surface facing the liquid crystal layer 13, an optical compensation film 14 as an optical compensation member and a polarizing plate 15 are formed in this order.

The reflective plate 8 and the upper substrate 16 are arranged so as to face each other, and the gap between the reflective plate 8 and the upper substrate 16 in peripheral portions of the glass substrates 2 and 3 is sealed with sealing agent 12. The liquid crystal layer 13 is formed between the alignments films 9 and 11 by injecting liquid crystal, e.g. ZLI 4427 manufactured by Merck & Co. Inc.

Figure 3A:
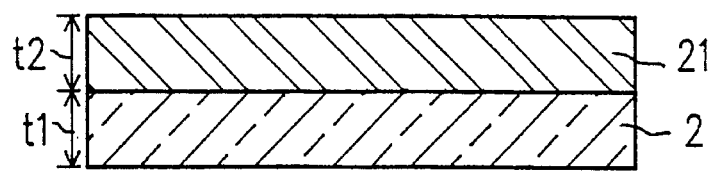
FIGS. 3A to 3E are cross sectional views showing the production steps of the reflective plate of FIG. 2.

An LCD of such a structure is produced as follows. As is shown in FIG. 3A, a resin film 21 is first formed by spin coating a photosensitive resin such as OFPR 800 (manufactured by Tokyo Ohka Kogyo Co., Ltd.) at a rotational speed of 500 r.p.m. to 3000 r.p.m. on a glass substrate 2 (Trade name: 7059, manufactured by Corning Inc.) having a thickness t1 of 1.1 mm. In this example, the resin film 21 is preferably formed by spin coating at a rotational speed of 2500 r.p.m. for 30 seconds, so that the thickness t2 of the film may be 1.5 µm.

Figure 3B:
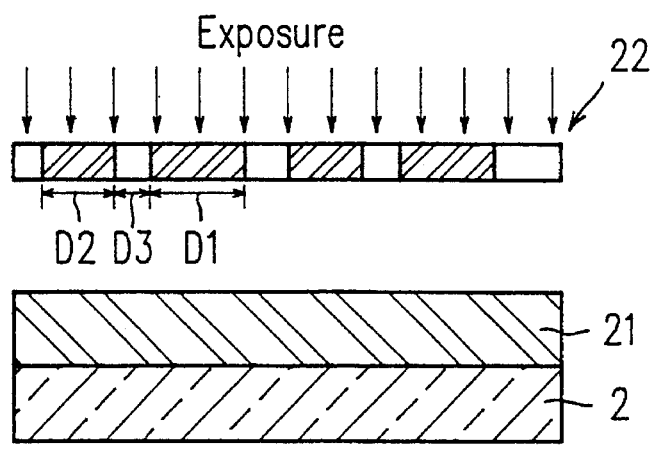
Figure 3C:
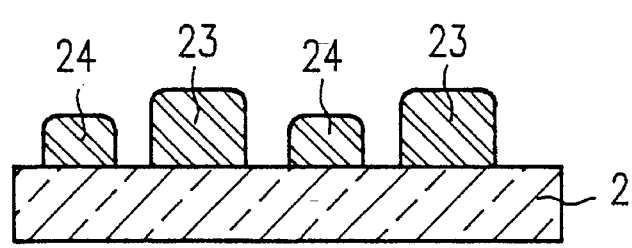

Then the resin film 21 which is formed on the glass substrate 2 is baked at 90° C. for 30 minutes. Next, as is shown in FIG. 3B, a photomask 22, in which a number of circular patterns consisting of larger ones and smaller ones are formed, is placed on the resin film 21 and is then exposed. After that, the exposed resin film 21 is developed by using a developing solution containing 2.38% NMD-3 (manufactured by Tokyo Ohka Kogyo Co., Ltd.), thereby forming larger projections 23 and smaller projections 24 having different heights on a surface of the glass substrate 2 as is shown in FIG. 3C. The difference of the heights is realized by adjusting the exposure time and the development time. In the photomask 22, as is shown in FIG. 2 by the arrangement state of larger 4 and smaller projections 5 which are formed in the above-described manner, circles of different diameters, consisting of ones of a larger diameter D1 (e.g. 10 µm) and ones of a smaller diameter D2 (e.g. 5 µm), are arranged at random. The gap D3 between adjacent circles is set to be 2 µm or more. However, the pattern of the photomask 22 is not limited to that described above.

Figure 3D:
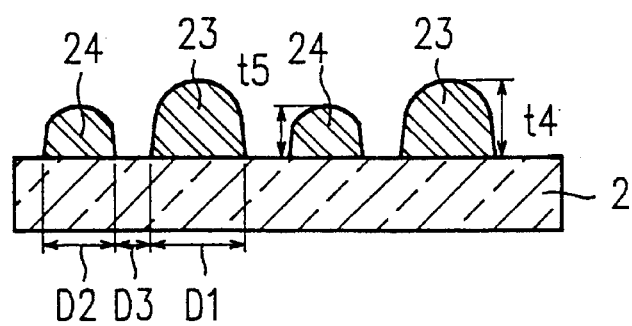

Next, the glass substrate 2 on which the larger 23 and smaller projections 24 are formed is heated at 200° C. for an hour. As a result, the top portions of the projections 23 and 24 are melted to a certain extent to be arch-shaped as is shown in FIG. 3D. These arch-shaped larger 23 and smaller projections 24 correspond to the larger 4 and smaller projections 5 shown in FIG. 1.

Figure 3E:
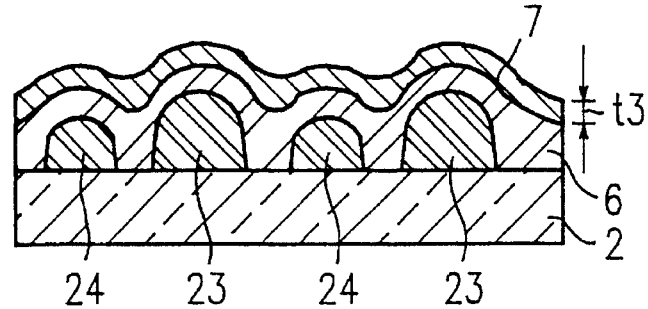

Over the glass substrate 2 in such a state, the same material as the above-mentioned photosensitive resin is spin coated at a rotational speed of 1000 r.p.m. to 3000 r.p.m. as is shown in FIG. 3E. In this example, the resin is preferably spin coated at a rotational speed of 2000 r.p.m. Consequently, an overcoating film 6 filling the concave portions between the projections 23 and 24 is formed so as to have a smooth and less ruggedly curved surface. In this example, the same resin as the photosensitive resin is used as the material of this overcoating film 6, however, this film 6 may be made of a different material. The height t4 of the larger projections 23 having the smooth surface is 0.7 µm and the height t5 of the smaller projections 24 having the smooth surface is 0.5 µm. Furthermore, reflective films 7 are provided over the overcoating film 6 by forming thereon a thin film made of a metal such as aluminum, nickel, chrome, silver, or gold so that the thickness t3 of the thin metal film may be in the range of 0.01–1.0 µm. In this example, the reflective films 7 are provided by coating the overcoating film 6 with aluminum by a sputtering method. The reflective films 7 have a rugged surface the levels of which are different by 0.5 µm. The reflective plate 8 is formed in the above-described manner, and, in the meantime, the upper substrate 16 is formed by the predetermined productions steps. The present inventors have found that the random arrangement in plan of the larger 23 and smaller projections 24 having different heights forms a rugged reflective surface which eliminates the coloring caused by the interference of the reflected light, thereby realizing a reflective surface emitting satisfactory white light.

Polyimide resin films are then formed as alignment films 9 and 11 (FIG. 1) on the reflective films 7 of the reflective plate 8 and on the transparent electrodes 10 of the upper substrate 16 and the resin films are cured at 220° C. for an hour. In this example, Sunever 150 (manufactured by Nissan Chemical Industries Ltd.) is employed as a material of these polyimide resin films. Subsequently, these polyimide resin films are subjected to a rubbing treatment so as to align the liquid crystal molecules 20 in order to obtain a desired twist angle of the liquid crystal layer, as is discussed more fully below, thereby forming the alignment films 9 and 11 on the reflective plate 8 and on the upper substrate 16, respectively.

The reflective plate 8 and the upper substrate 16 are positioned so that the alignment film 9 faces the alignment film 11, and are then attached to each other by sealing the gap between the glass substrates 2 and 3 with a sealing agent 12. For example, the sealing agent 12 is formed by a screen printing method using an adhesive sealing agent with which spacers having a diameter of 6.5 μm are dispersed.

Finally, liquid crystal is injected into the gap between the reflective plate 8 and the upper substrate 16 by a vacuum injection method, thereby forming a liquid crystal layer 13. At the same time, the thickness of the liquid crystal layer 13 is controlled by dispersing spacers having a diameter of 5.8 μm. The liquid crystal layer 13 interposed between the two glass substrates 2 and 3 has a twist angle of 240° and includes a nematic liquid crystal 20 (e.g. ZLI4427, manufactured by Merck & Co., Inc.) having a positive dielectric anisotropy and a chiral dopant. The retardation value of the liquid crystal layer 13 is 0.65 μm and that of the optical compensation film 14 provided on the upper substrate 16 is set to be 0.35 μm in this example.

Figure 4:
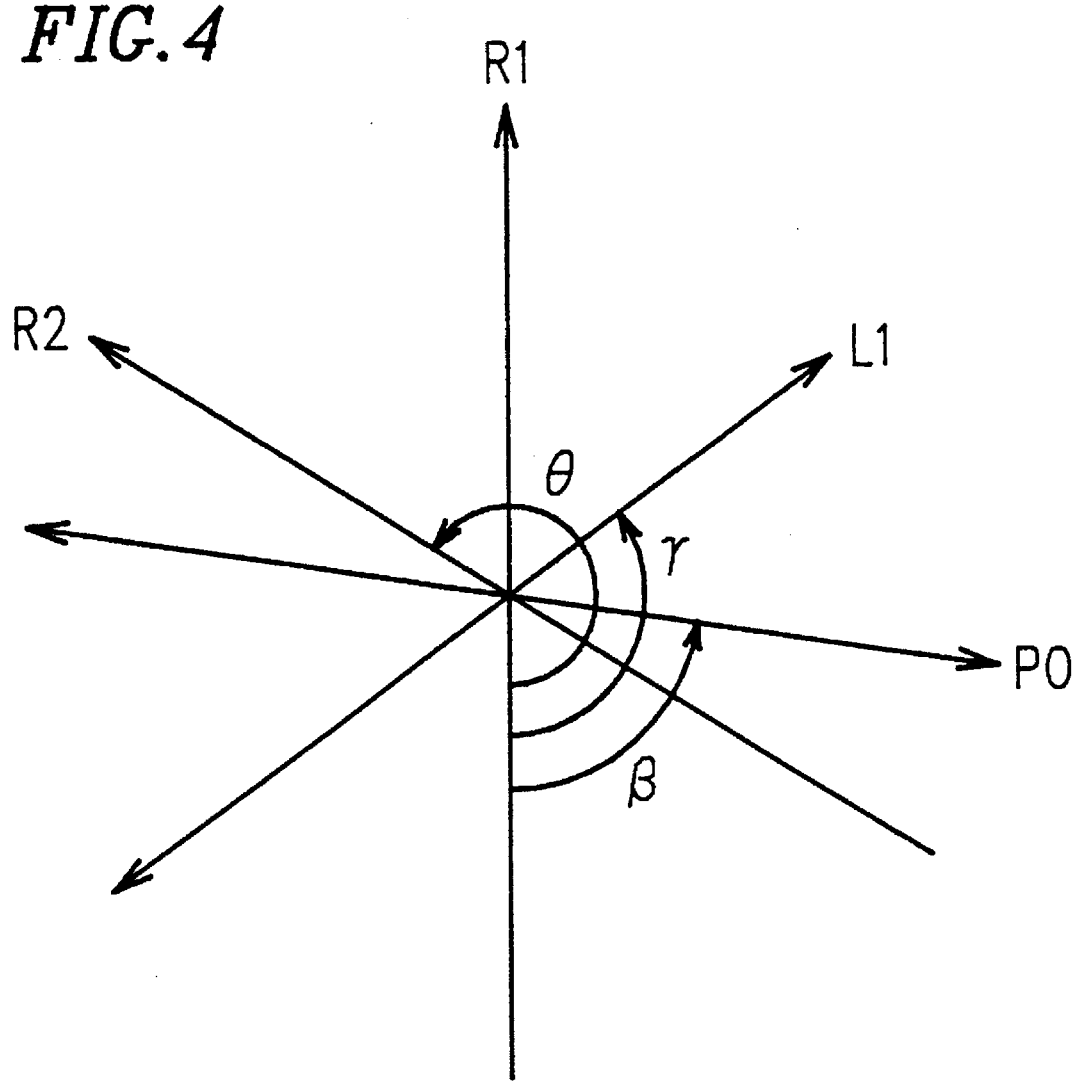
FIG. 4 is a diagrammatic view showing the optical arrangement of the liquid crystal display device of an example according to the present invention.

The optical arrangement of the polarizing plate 15, the optical compensation film 14, and the liquid crystal layer 13 in the LCD thus obtained is defined as is shown in FIG. 4, which is a view when the LCD of FIG. 1 is observed from above. Specifically, R1 indicates the alignment direction of the liquid crystal molecules on a side of the liquid crystal layer 13 on which the upper substrate 16 is provided, β is an angle formed counterclockwise between the alignment direction R1 and the axis direction PO of the polarization axis (absorption axis or transmission axis) of the polarizing plate 15, and γ is an angle formed counterclockwise between the alignment direction R1 and the axis direction L1 of the slower optical axis of the optical compensation film 14. In addition, a twist angle formed counterclockwise between the alignment direction R1 (the direction shown by the arrow is the rubbing direction) and the alignment direction R2 of the liquid crystal molecules on a side of the liquid crystal layer 13 on which the reflective plate 8 is provided (the direction shown by the arrow is the rubbing direction) is indicated by δ with a positive value.

Figure 5:
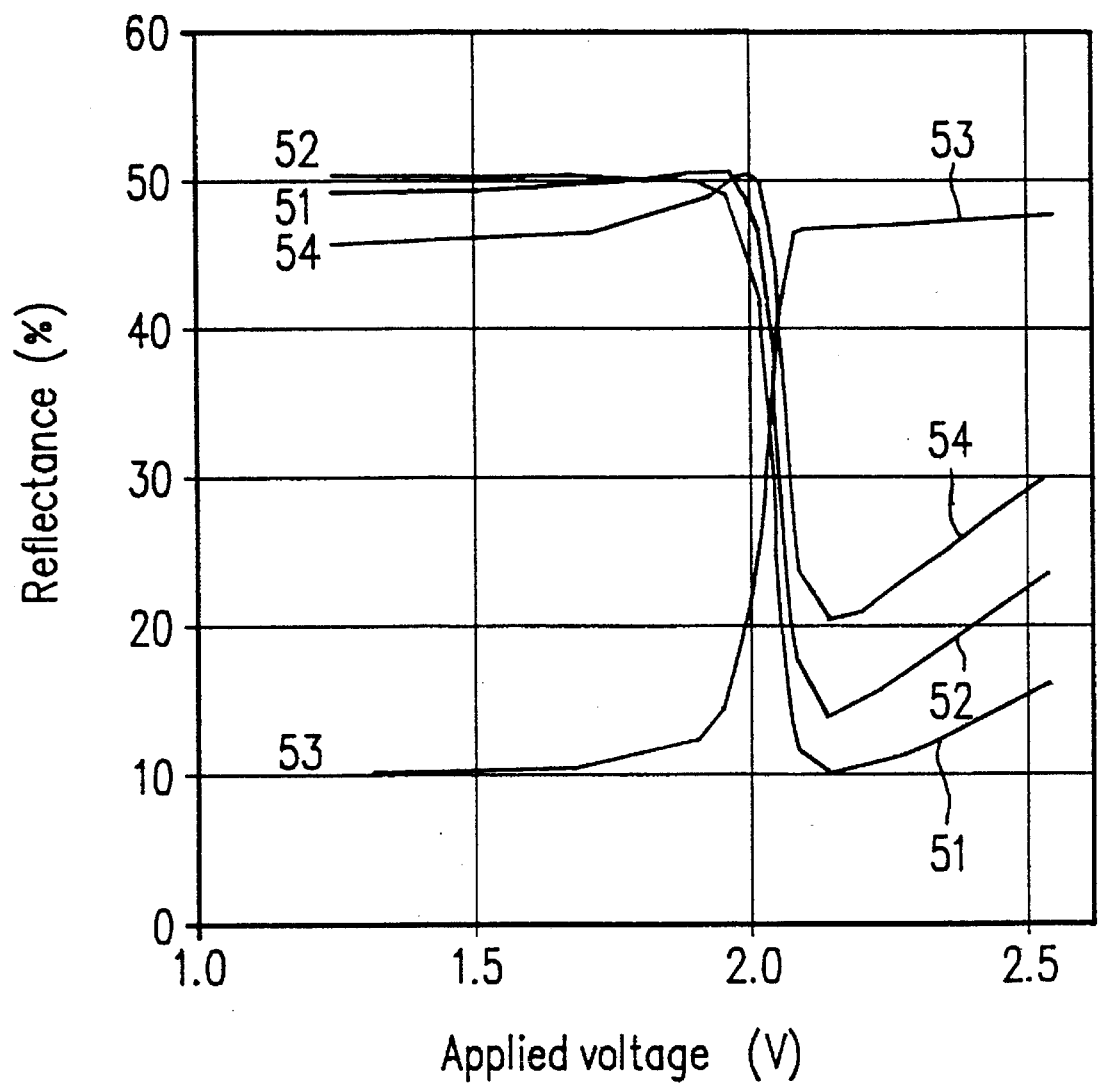
FIG. 5 is a graph showing the voltage-reflectance characteristics of the liquid crystal display devices of examples according to the present invention.

FIG. 5 is a graph showing the relationship between the applied voltage to the reflective liquid crystal display device and the reflectance thereof which is measured through a luminous filter. The voltage is applied across the electrodes 7 and 10. In this figure, the characteristic curve 51 is observed in the case where β=5° and γ=−90°; the characteristic curve 52 is observed in the case where β=10° and γ=−85°; the characteristic curve 53 is observed in the case where β=70° and γ=45°; and the characteristic curve 54 is observed when β=20° and γ=−75° and a low contrast ratio is obtained. The characteristic curves 51, 52 and 54 indicate that the display of the LCD is conducted in a Normally White mode, and the characteristic curve 53 indicates that the display of the LCD is conducted in a Normally Black mode. The measurement conditions are as follows: the twist angle of the liquid crystal layer 13 is 240°; the retardation value $\Delta n_1 d_1$ of the liquid crystal layer 13 is 0.65 μm; and the retardation value $\Delta n_2 d_2$ of the optical compensation film 14 is 0.35 μm. A polarizing plate is used in which the parallel transmittance is 47% and the contrast ratio of the parallel transmittance to the crossed transmittance is 8. The parallel transmittance means the transmittance of the two polarizing plates in a parallel Nicols state, and the crossed transmittance means the transmittance of the two polarizing plates in a crossed Nicols state.

As is understood from FIG. 5, in the characteristic curves 51, 52 and 53, a brighter display with a high contrast ratio is obtained in which coloring can be eliminated in gray-scale tones under the application of a voltage or no voltage; 1/240 duty drive is possible owing to the steep threshold characteristics; neither double images nor parallaxes are produced because the reflective plate is included in the liquid crystal cell.

As for the LCD in this example, the present inventors have confirmed that 50% of the white light which was incident at an angle of 30° to the normal of the LCD 1 was reflected and the contrast ratio was 6. A standard white plate made of magnesium oxide (MgO) was used as a standard reflective member determining the reflectance. In addition, it has been confirmed that coloring is eliminated even when a gray-scale tone is displayed.

Figure 6:
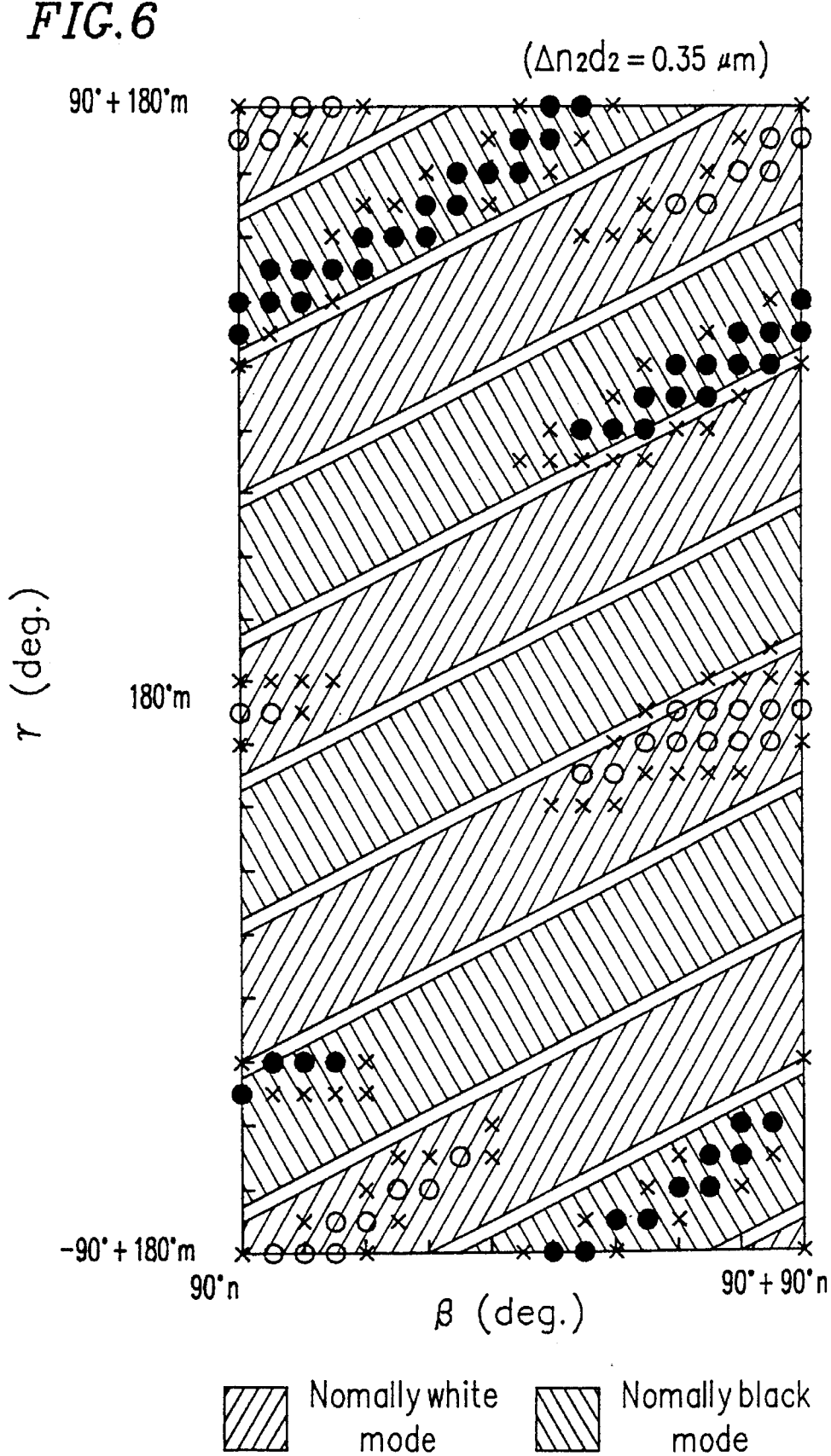
FIG. 6 is a view showing a display characteristic of the liquid crystal display device of an example according to the present invention when the retardation value $\Delta n_2 d_2$ is 0.35 µm.

FIG. 6 shows the conditions in which the above-mentioned display can be obtained in the LCD of this example, meaning the twist angle is 240°, the retardation value $\Delta n_1 d_1$ of the liquid crystal layer is 0.65 μm, and the retardation value $\Delta n_2 d_2$ of the optical compensation film 14 is 0.35 μm. In this figure, the open circles "○" indicate the excellent display region in a Normally White mode in which the coloring can be eliminated, when Roff is more than 45% and Ron is less than 10%. Roff and Ron are reflectances when no voltage is applied and when a voltage is applied, respectively. A "voltage off" condition refers to the case where the voltage applied across the electrodes 7 and 11 is less than a threshold voltage (e.g., less than 2.0 volts as is shown in FIG. 5). A "voltage on" condition refers to the case where the applied voltage is more than a threshold voltage (e.g. more than 2.2 volts as is shown in FIG. 5). The closed circles "●" indicate the excellent display region in a Normally Black mode in which the coloring can be eliminated when Roff is less than 10% and Ron is more than 45%. "X"s indicate satisfactory display region surrounding the excellent display regions in a Normally White mode and a Normally Black mode, and m's and n's indicate integers. In the axis of the abscissa, 90°n is equivalent to 90°+90°n, and in the axis of the ordinate, 90°+180°m is equivalent to −90°+180°m. Therefore, similar relationship can be obtained even when the values of n and m are increased by 1, respectively.

As is understood from FIG. 6, the conditions for determining the angles β and γ, at which a brighter display can be obtained with high contrast under the application of no voltage or a voltage and the coloring can be eliminated even when a gray-scale display is conducted, are limited to a predetermined range; however, it has been confirmed that there occurs no problem in practical use as long as the satisfactory display can be conducted (i.e., operation at least within the regions denoted by "X"s). In addition, it has been confirmed that a similar result can be obtained when the twist angle is in the range of 220° to 260°, and the retardation value $\Delta n_1 d_1$ is in the range of 0.5 μm to 0.8 μm.

Figure 7:
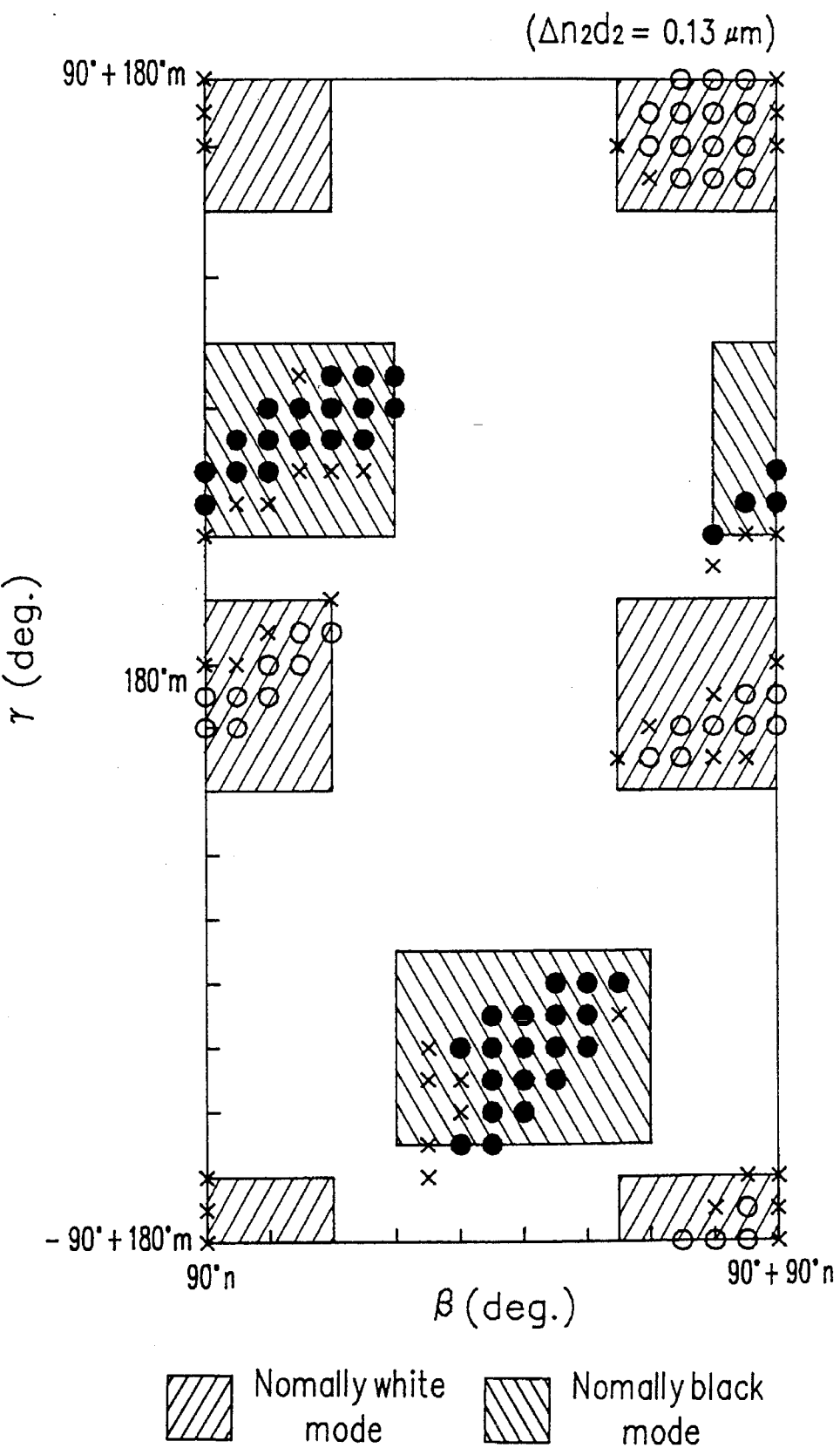
FIG. 7 is a view showing a display characteristic of the liquid crystal display device of an example according to the present invention when the retardation value $\Delta n_2 d_2$ is 0.13 µm.
Figure 8:
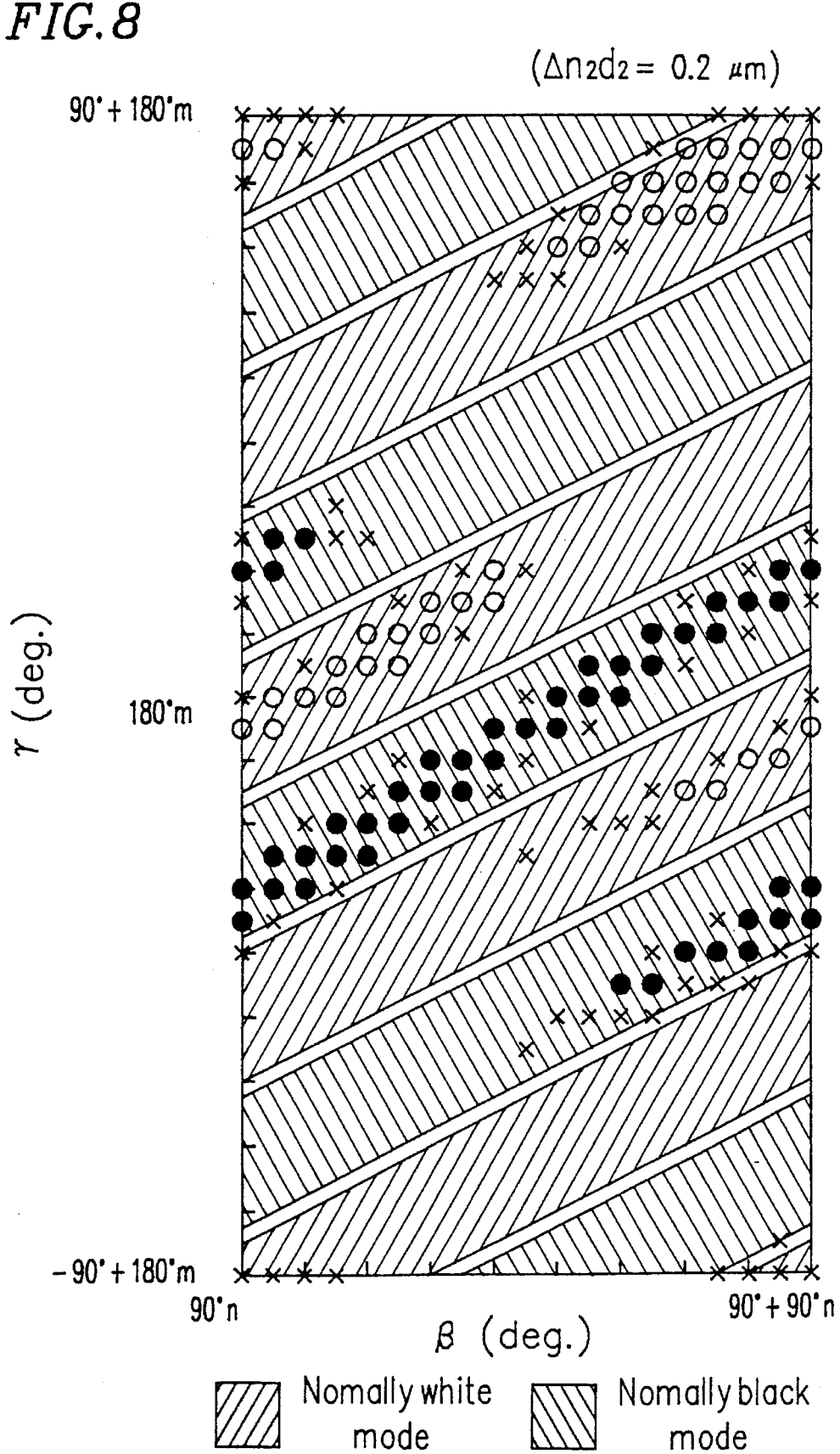
FIG. 8 is a view showing a display characteristic of the liquid crystal display device of an example of according to the present invention when the retardation value $\Delta n_2 d_2$ is 0.2 µm.
Figure 10:
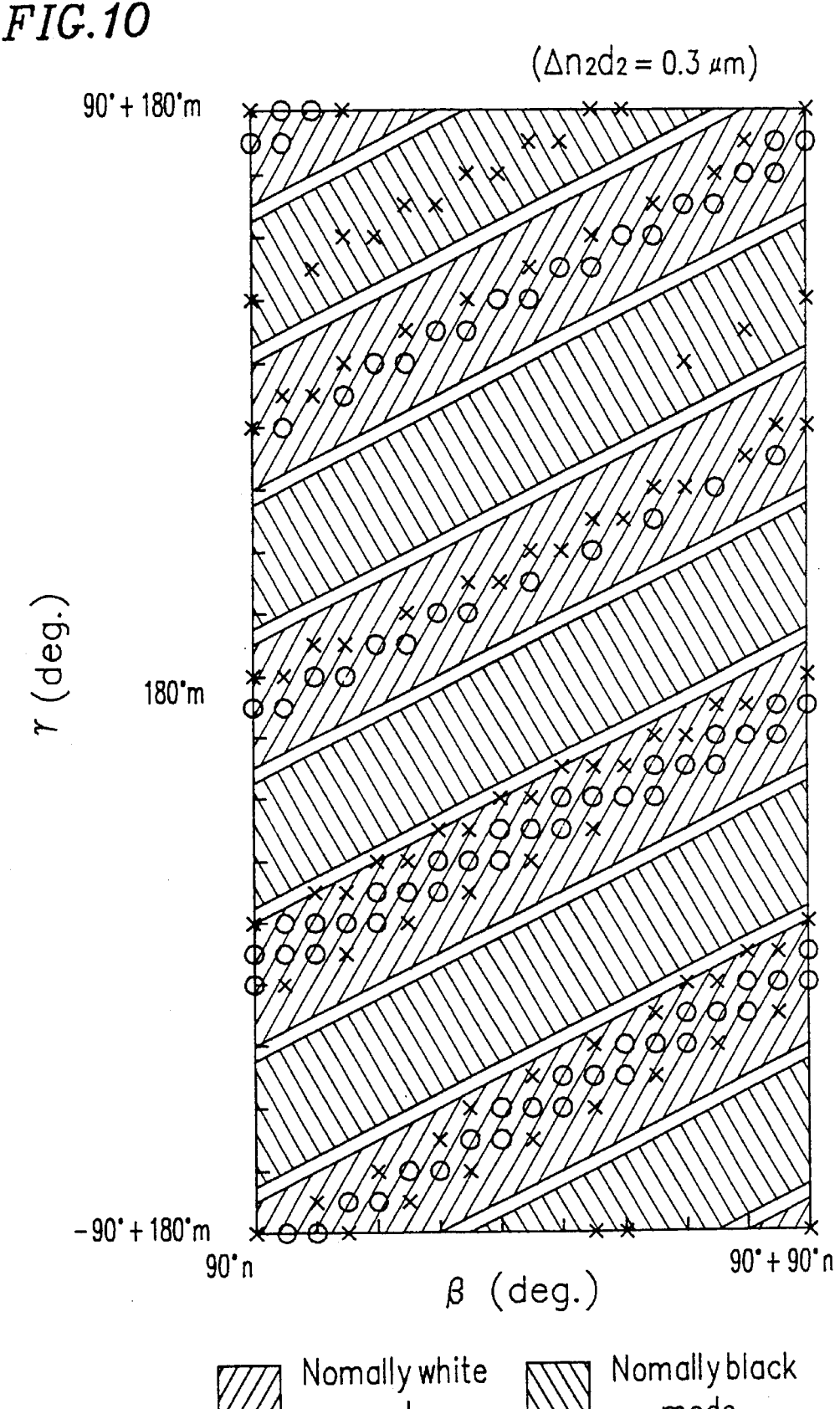
FIG. 10 is a view showing a display characteristic of the liquid crystal display device of an example according to the present invention when the retardation value $\Delta n_2 d_2$ is 0.3 µm.
Figure 11:
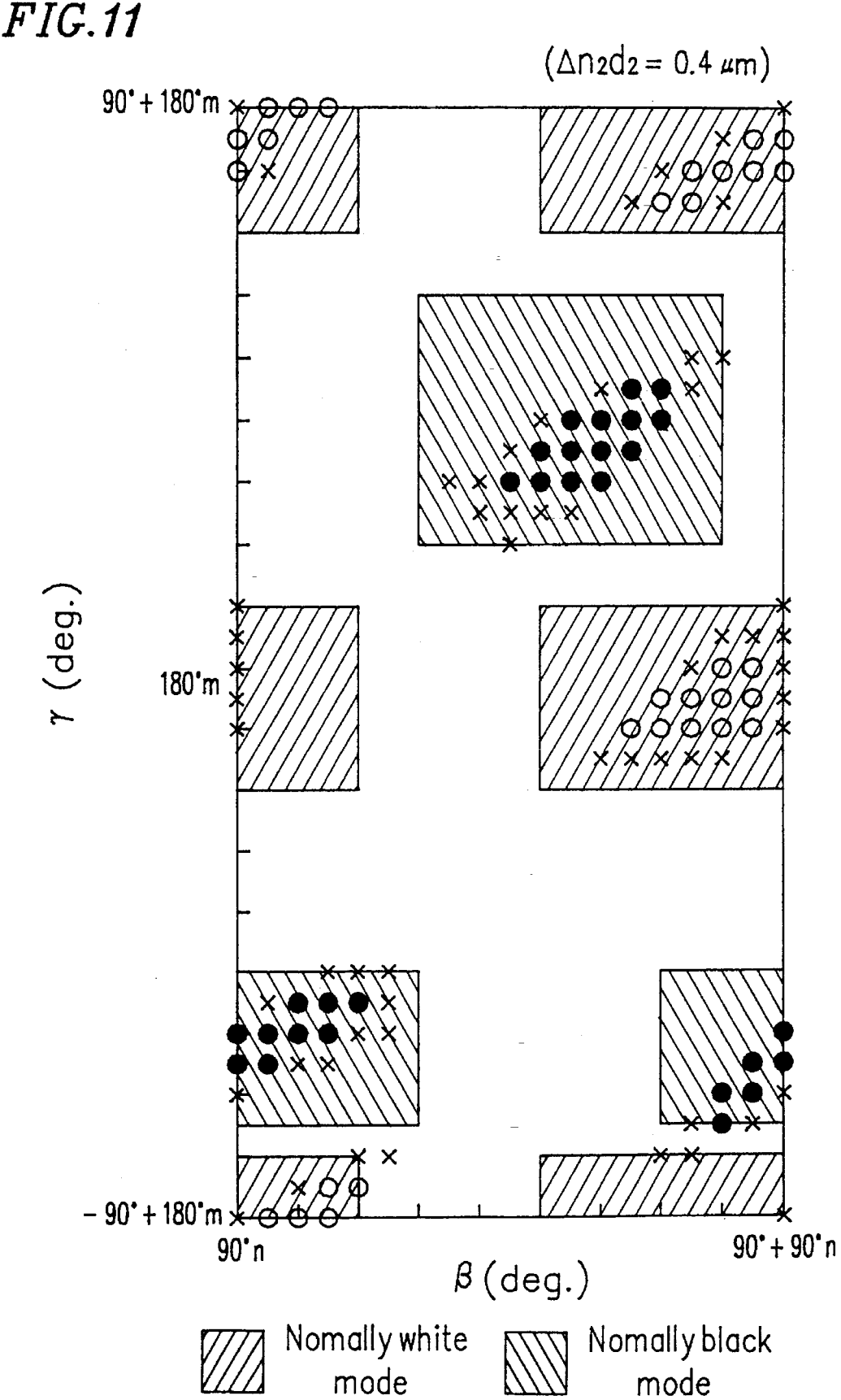
FIG. 11 is a view showing a display characteristic of the liquid crystal display device of an example according to the present invention when the retardation value $\Delta n_2 d_2$ is 0.4 µm.
Figure 12:
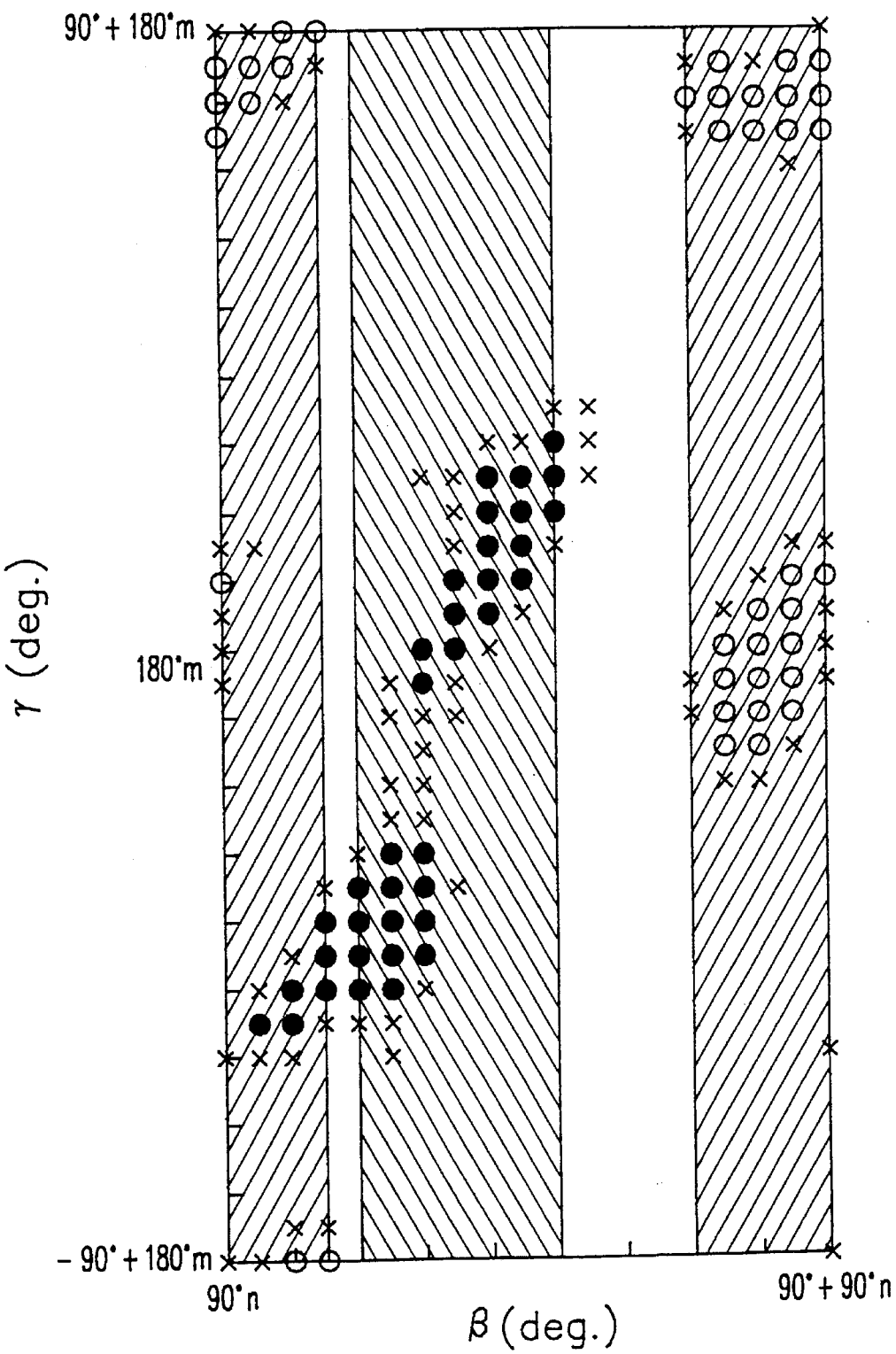
FIG. 12 is a view showing a display characteristic of the liquid crystal display device of an example according to the present invention when the retardation value $\Delta n_2 d_2$ is 0.45 µm.
Figure 13:
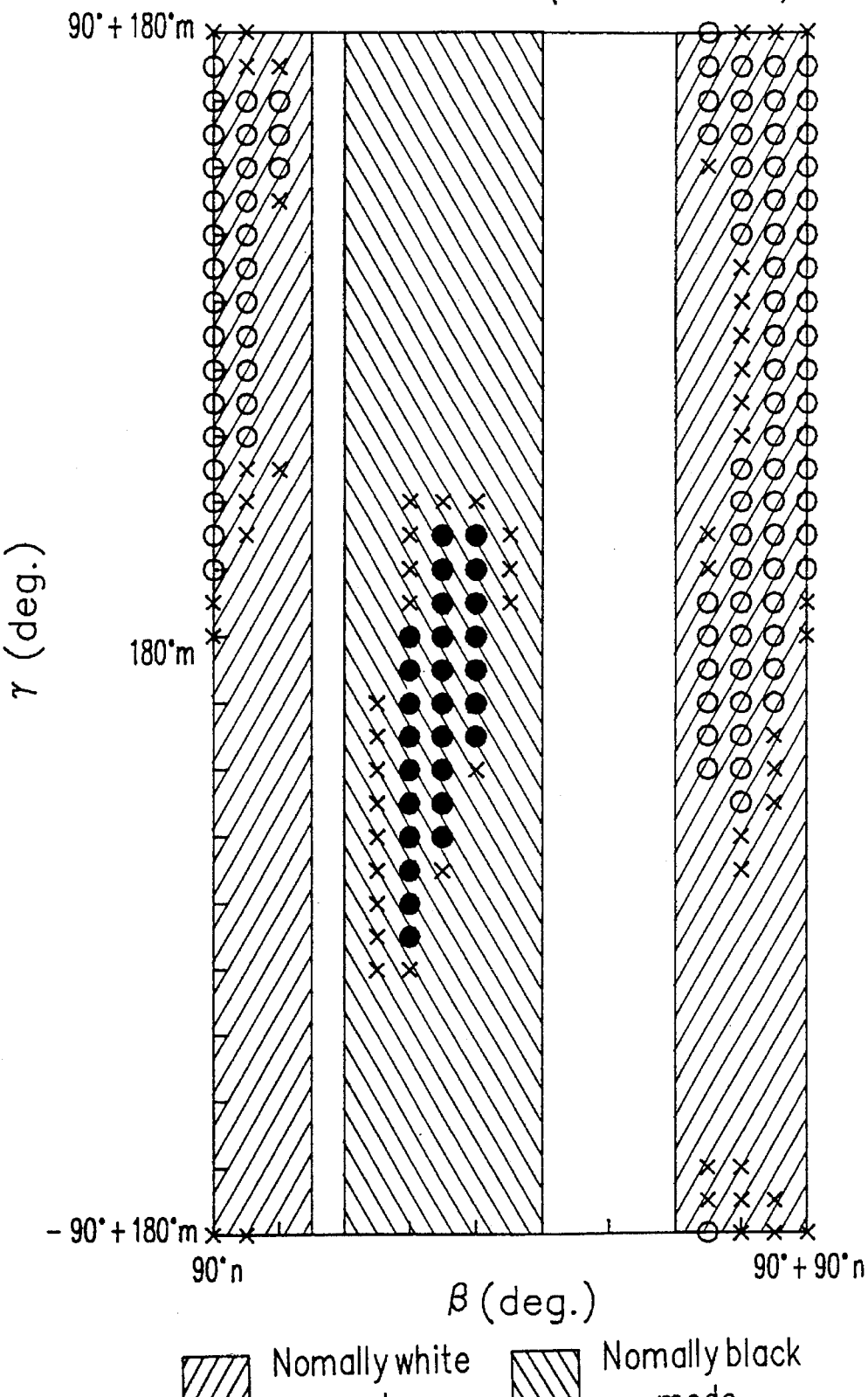
FIG. 13 is a view showing a display characteristic of the liquid crystal display device of an example according to the present invention when the retardation value $\Delta n_2 d_2$ is 0.5 µm.

In the same manner as FIG. 6, FIGS. 7 to 13 show the conditions for obtaining a satisfactory display when the retardation value $\Delta n_2 d_2$ of the optical compensation film 14 of the LCD of FIG. 1 is changed. FIG. 7 shows the display characteristics according to the various setting values of the angles β and γ under the conditions where the twist angle is 240°, $\Delta n_2 d_2$ is 0.13 µm, and $\Delta n_1 d_1$ is 0.65 µm. FIG. 8 shows the display characteristics according to the various setting values of the angles β and γ under the conditions where the twist angle is 240°, $\Delta n_2 d_2$ is 0.20 µm, and $\Delta n_1 d_1$ is 0.65 µm. FIG. 9 shows the display characteristics according to the various setting values of the angles β and γ under the conditions where the twist angle is 240°, $\Delta n_2 d_2$ is 0.25 µm, and $\Delta n_1 d_1$ is 0.65 µm. FIG. 10 shows the display characteristics according to the various setting values of the angles β and γ under the conditions where the twist angle is 240°, $\Delta n_2 d_2$ is 0.30 µm, and $\Delta n_1 d_1$ is 0.65 µm. FIG. 11 shows the display characteristics according to the various setting values of the angles β and γ under the conditions where the twist angle is 240°, $\Delta n_2 d_2$ is 0.40 µm, and $\Delta n_1 d_1$ is 0.65 µm. FIG. 12 shows the display characteristics according to the various setting values of the angles β and γ under the conditions where the twist angle is 240°, $\Delta n_2 d_2$ is 0.45 µm, and $\Delta n_1 d_1$ is 0.65 µm. FIG. 13 shows the display characteristics according to the various setting values of the angles β and γ under the conditions where the twist angle is 240°, $\Delta n_2 d_2$ is 0.50 µm, and $\Delta n_1 d_1$ is 0.65 µm. In each of these FIGS. 7 to 13, in the same way as in FIG. 6, the open circles "○" indicate the excellent display regions in a Normally White mode, the closed circles "●" indicate the excellent display regions in a Normally Black mode, and the "X"s indicate the satisfactory display regions surrounding the excellent display regions in a Normally White mode and a Normally Black mode.

As will be understood from FIGS. 6 to 13, the conditions for obtaining a satisfactory display include the retardation values $\Delta n_2 d_2$ as well as the angles β and γ. In order to obtain a satisfactory display when the retardation values $\Delta n_2 d_2$ are 0.2 µm (FIG. 8), 0.25 µm (FIG. 9), 0.3 µm (FIG. 10), and 0.35 µm (FIG. 6), respectively, the following equations must be satisfied:

if the display is conducted in a Normally White mode, $$0.5\beta + 45°m - 15° \leq \gamma \leq 0.5\beta + 45°m + 5° \quad (1)$$

(where m is an integer)

if the display is conducted in a Normally Black mode, $$0.5\beta + 45°m + 7.5° \leq \gamma \leq 0.5\beta + 45°m + 27.5° \quad (2)$$

It is preferred to use the regions around "X", or more preferably the regions around the open circles "○" in a Normally White mode, and the regions around the closed circles "●" in a Normally Black mode in these figures.

Moreover, it has been confirmed that the retardation values $\Delta n_2 d_2$ may be in the range of 0.15 µm to 0.38 µm in order to obtain a satisfactory display when the above Equations (1) and (2) are satisfied.

If the retardation value $\Delta n_2 d_2$ is 0.45 µm or more as is shown in FIGS. 12 and 13, the display characteristics depend gradually on the angle β, regardless of the above-mentioned equations. Therefore, in order to obtain a satisfactory display, the following equations must be satisfied:

if the display is conducted in a Normally White mode, $$70° + 90°n \leq \beta \leq 105° + 90°n \text{ (where n is an integer)} \quad (3)$$

if the display is conducted in a Normally Black mode, $$20° + 90°n \leq \beta \leq 50° + 90°n \quad (4)$$

It is preferred to use the regions around "X", or more preferably the regions around the open circles "○" in a Normally White mode, and the regions around the closed circles "●" in a Normally Black mode in these figures.

Moreover, it has been confirmed that the retardation values $\Delta n_2 d_2$ may be in the range of 0.43 µm to 0.55 µm in order to obtain a satisfactory display when the above Equations (3) and (4) are satisfied.

When the retardation values $\Delta n_2 d_2$ are 0.13 µm (FIG. 7) and 0.4 µm (FIG. 11), the display characteristics are in the middle of the above-mentioned two states. In order to obtain a satisfactory display when the retardation value $\Delta n_2 d_2$ is 0.13 µm, the following equations must be satisfied:

if the display is conducted in a Normally White mode, $$65° + 90°n \leq \beta \leq 110° + 90°n, \text{ and } -20° + 90°m \leq \gamma \leq 10° + 90°m \quad (5)$$

if the display is conducted in a Normally Black mode, $$30° + 90°n \leq \beta \leq 70° + 90°n, \text{ and } -75° + 180°m \leq \gamma \leq -45° + 180°m \quad (6)$$

alternatively, $$80° + 90°n \leq \beta \leq 120° + 90°n, \text{ and } 20° + 180°m \leq \gamma \leq 50° + 180°m \quad (7)$$

On the other hand, in order to obtain a satisfactory display when the retardation value $\Delta n_2 d_2$ is 0.4 µm, the following equations must be satisfied:

if the display is conducted in a Normally White mode, $$50° + 90°n \leq \beta \leq 110° + 90°n, \text{ and } -20° + 90°m \leq \gamma \leq 10° + 90°m \quad (8)$$

if the display is conducted in a Normally Black mode, $$30° + 90°n \leq \beta \leq 80° + 90°n, \text{ and } 20° + 180°m \leq \gamma \leq 60° + 180°m \quad (9)$$

alternatively, $$70° + 90°n \leq \beta \leq 120° + 90°n, \text{ and } -75° + 180°m \leq \gamma \leq -50° + 180°m \quad (10)$$

When the retardation values $\Delta n_2 d_2$ are 0.13 µm and 0.4 µm, it is preferred to use the regions around "X", or more preferably, the regions around the open circles "○" in a Normally White mode, and the regions around the closed circles "●" in a Normally Black mode in these figures.

Moreover, it has been confirmed that the retardation values $\Delta n_2 d_2$ may be in the range of 0 µm to 0.15 µm in order to obtain a satisfactory display when the above Equations (5) to (7) are satisfied. In addition, it has also been confirmed that the retardation values $\Delta n_2 d_2$ may be in the range of 0.38 µm to 0.43 µm in order to obtain a satisfactory display when the above Equations (8) to (10) are satisfied.

In the above-mentioned examples, a liquid crystal cell the twist angle of which is 240° is used, however, the present invention is not limited thereto: it has been confirmed that a similar result can be obtained by applying the present invention if the twist angle is in the range of 220° to 260°.

Figure 14:
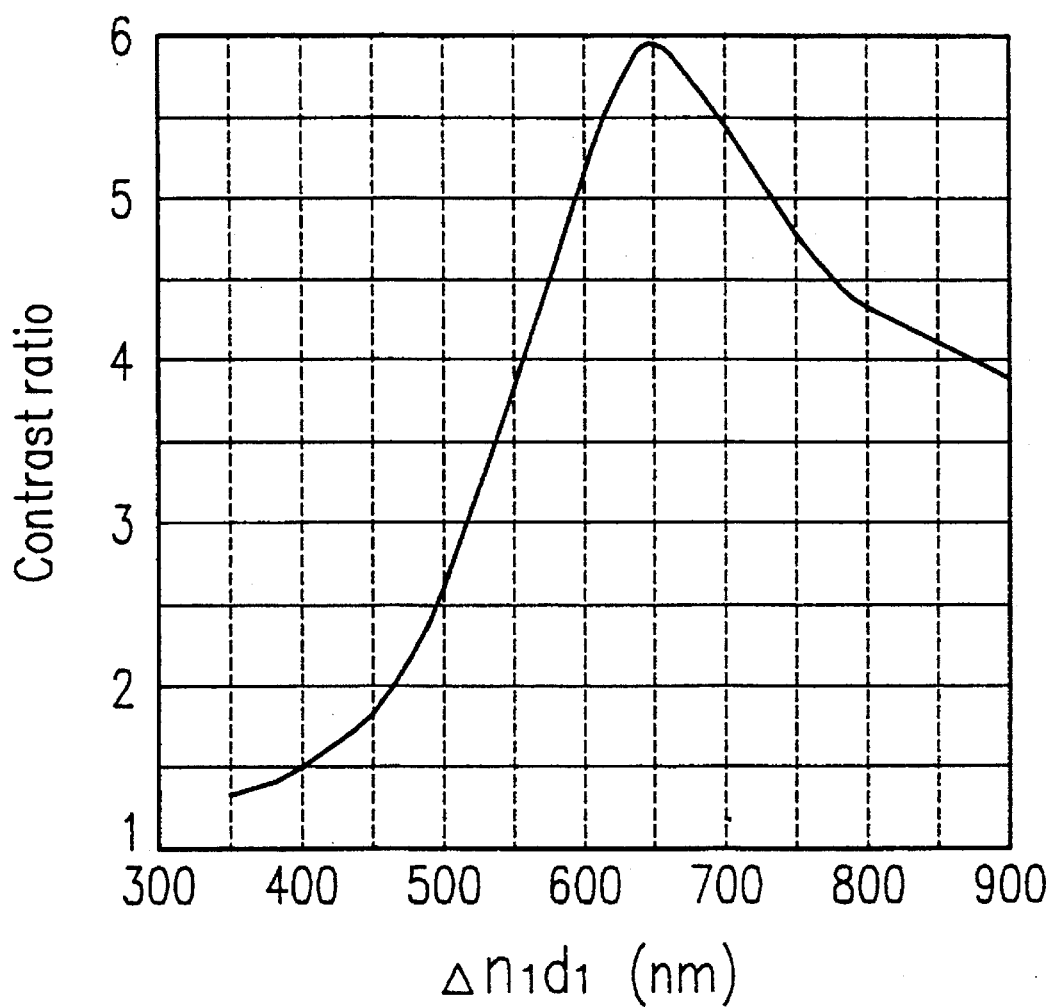
FIG. 14 is a graph showing the dependence of the contrast ratio on the retardation value $\Delta n_1 d_1$ when $\Delta n_2 d_2$ is 0.35 µm, the angle β is 5°, and the angle γ is −90°.

As is shown in FIG. 14, the contrast ratio becomes maximum when the retardation value $\Delta n_1 d_1$ is 0.65 µm and the retardation value $\Delta n_1 d_1$ of the liquid crystal layer is set to be 0.65 µm in the above-mentioned examples. However, according to the present invention, the retardation value $\Delta n_1 d_1$ is not necessarily 0.65 µm, but may be in the range of 0.5 µm to 0.8 µm, or more preferably, in the range of 0.58 µm to 0.78 µm. As is apparent from FIG. 14, a satisfactory display cannot be obtained if the contrast ratio is 2.5 or less, and a viewing angle becomes extremely narrow if the retardation value $\Delta n_1 d_1$ is more than 0.8 µm. That is why, if the retardation value $\Delta n_1 d_1$ is in the range of 0.5 µm to 0.8 µm, or more preferably, in the range of 0.58 µm to 0.78 µm, a satisfactory display can be obtained with a high contrast ratio and a wide viewing angle by applying the present invention.

The optical compensation film 14 is formed on the upper surface of the glass substrate 3 in the above-mentioned examples. According to the present invention, however, a similar effect can be obtained in the case where the optical compensation film 14 is formed on the lower surface of the glass substrate 3.

In the above-mentioned examples, an extended film made of polycarbonate is used as an optical compensation film 14; however, the present invention is not limited thereto, but extended films made of polyvinylalcohol PVA, polymetylmetacrylate PMMA, or the like can also be used. Furthermore, according to the present invention, an optical compensation substrate formed by an oblique evaporation method can be used as an optical compensation member, instead of the optical compensation film 14 used herein.

Figure 15:
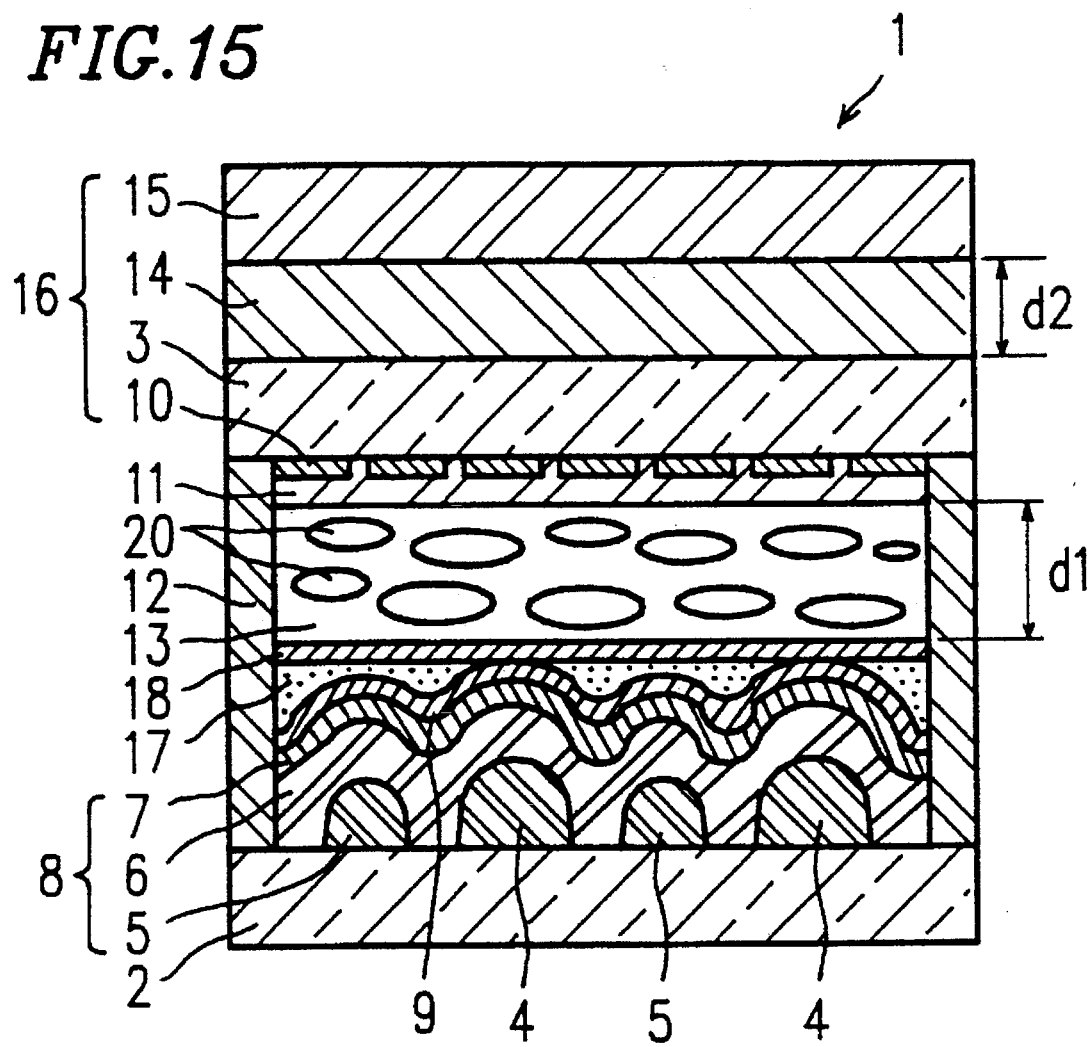
FIG. 15 is a cross-sectional view of a liquid crystal display device of another example according to the present invention.

The reflective film 7 was used as a display electrode in the above-mentioned examples. Alternatively, even steeper threshold characteristics can be obtained by forming transparent electrodes 18 on a transparent planation film 17 which is coated on the rugged reflective film 7 in order to planate the ruggedness thereof, as is shown in FIG. 15.

According to the present invention, an opaque substrate such as a silicon substrate can also be used, instead of the glass substrate 2 used herein, for in the case of using such an opaque substrate, it has also been confirmed that a similar effect can be obtained. In addition, with a silicon substrate, integrated circuit elements can conveniently be formed on the silicon substrate.

Moreover, according to the present invention, a multicolor display or a full color display can be realized by forming a color filter layer on a side of the reflective plate 8 or the upper substrate 16 of FIG. 1.

The difference of the levels of the reflective plate 8 facing the liquid crystal layer is set to be 0.5 μm in the above-mentioned examples; however, in the case where the difference is in the range of 0.1 μm to 1.5 μm, it has been confirmed that a satisfactory reflective surface emitting white light is realized.

As is described above, according to the present invention, the relationship among the retardation values of the optical compensation plate and of the liquid crystal layer, and the setting angles of the optical compensation plate and of the polarizing plate is made clear. As a result, a brighter display with high contrast is obtained in which the coloring can be eliminated even when a gray-scale display is conducted. If the present invention is applied to the reflective LCD, a high-definition and high quality LCD is realized in which optical reflective member is formed inside the liquid crystal device and parallaxes can be eliminated. Moreover, by employing the liquid crystal display mode of the present invention which has steep threshold characteristics, it is possible to conduct a high-density multiplexing drive and increase the display capacity.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflective liquid crystal display device comprising: a first substrate; a second substrate; a liquid crystal layer interposed between said first substrate and said second substrate; electrodes for applying a voltage to said liquid crystal layer; a single polarizing plate provided on a side of said liquid crystal layer on which said first substrate is provided; a reflective member provided on a side of said liquid crystal layer on which said second substrate is provided; and an optical compensation member provided between said polarizing plate and said liquid crystal layer, wherein said liquid crystal layer has a twist angle in a range of 220° to 260° and a retardation value of 0.5 μm to 0.8 μm, said optical compensation member has a retardation value in a range of 0.15 μm to 0.38 μm, and an angle β which is formed between a polarization axis direction of said polarizing plate and an alignment direction of liquid crystal molecules in said liquid crystal layer on a side of said polarizing plate, and an angle γ which is formed between an axis direction of a slower optical axis of said optical compensation member and an alignment direction of said liquid crystal molecules, satisfy expressions (A1), (A2) and (A3):

$$90° \leq \beta \leq 90°(n+1) \quad (A1)$$

$$-90° \leq \gamma \leq 90° \quad (A2)$$

$$0.5(\beta-90°n)+22.5°m-15° \leq \gamma \leq 0.5(\beta-90°n)+22.5°m+5° \quad (A3)$$

wherein m is an integer selected from the group of −6, −5, −4, −3, −2, 3 and 4, and n is an integer.

2. A liquid crystal display device according to claim 1, wherein said reflective member is provided between said first substrate and said liquid crystal layer and has a reflective surface on a side of said liquid crystal layer.

3. A liquid crystal display device according to claim 2, wherein said reflective member has a ruggedness the levels of which are different by 0.1 μm to 1.5 μm.

4. A liquid crystal display device according to claim 3, wherein said reflective film is a conductive reflective film and functions as a part of said electrodes.

5. A liquid crystal display device according to claim 3, further comprising a transparent planation layer formed on said reflective member and planating said ruggedness of said reflective member, and a transparent electrode formed on said planation layer and functioning as a part of said electrodes.

6. A liquid crystal display device according to claim 3, further comprising a color filter layer on a side of said liquid crystal layer on which said first substrate is provided.

7. A reflective liquid crystal display device comprising: a first substrate; a second substrate; a liquid crystal layer interposed between said first substrate and said second substrate; electrodes for applying a voltage to said liquid crystal layer; a single polarizing plate provided on a side of said liquid crystal layer on which said first substrate is provided; a reflective member provided on a side of said liquid crystal layer on which said second substrate is provided; and an optical compensation member provided between said polarizing plate and said liquid crystal layer, wherein said liquid crystal layer has a twist angle in a range of 220° to 260° and a retardation value in a range of 0.5 μm to 0.8 μm, said optical compensation member has a retardation value in a range of 0.43 μm to 0.55 μm, and an angle β which is formed between a polarization axis direction of said polarizing plate and an alignment direction of liquid crystal molecules in said liquid crystal layer on a side of said polarizing plate satisfies one of following expressions (C) and (D) when n is an integer:

$$70°+90°n \leq \beta \leq 105°+90°n \quad (C)$$

$$20°+90°n \leq \beta \leq 50°+90°n \quad (D).$$

8. A liquid crystal display device according to claim 7, wherein said reflective member is provided between said first substrate and said liquid crystal layer and has a reflective surface on a side of said liquid crystal layer.

9. A liquid crystal display device according to claim 8, wherein said reflective member has a ruggedness the levels of which are different by 0.1 µm to 1.5 µm.

10. A liquid crystal display device according to claim 9, wherein said reflective film is a conductive reflective film and functions as a part of said electrodes.

11. A liquid crystal display device according to claim 9, further comprising a transparent planation layer formed on said reflective member and planating said ruggedness of said reflective member, and a transparent electrode formed on said planation layer and functioning as a part of said electrodes.

12. A liquid crystal display device according to claim 9, further comprising a color filter layer on a side of said liquid crystal layer on which said first substrate is provided.

13. A reflective liquid crystal display device comprising: a first substrate; a second substrate; a liquid crystal layer interposed between said first substrate and said second substrate; electrodes for applying a voltage to said liquid crystal layer; a polarizing plate provided on a side of said liquid crystal layer on which said first substrate is provided; a reflective member provided on a side of said liquid crystal layer on which said second substrate is provided; a reflective member provided on a side of said liquid crystal layer on which said second substrate is provided; and an optical compensation member provided between said polarizing plate and said liquid crystal layer, wherein said liquid crystal layer has a twist angle in a range of 220° to 260° and a retardation value in a range of 0.5 µm to 0.8 µm, said optical compensation member has a retardation value in a range of 0 µm to 0.15 µm, and an angle β which is formed between a polarization axis direction of said polarizing plate and an alignment direction of liquid crystal molecules in said liquid crystal layer on a side of said polarizing plate, and an angle γ which is formed between an axis direction of a slower optical axis of said optical compensation member and an alignment direction of said liquid crystal molecules, satisfy one of following expressions (E), (F) and (G) when m and n are integers:

$65°+90°n \leq \beta \leq 110°+90°n$, and $-20°+90°m \leq \gamma \leq 10°+90m$ (E)

$30°+90°n \leq \beta \leq 70°+90°n$, and $-75°+180°m \leq \gamma \leq -45°+180°m$ (F)

$80°+90°n \leq \beta \leq 120°+90°n$, and $20°+180°m \leq \gamma \leq -50°+180°m$ (G); and further comprising a transparent planation layer formed on said reflective member and planating a ruggedness of said reflective member, and a transparent electrode formed on said planation layer and functioning as a part of said electrodes.

14. A liquid crystal display device according to claim 13, wherein said reflective member is provided between said first substrate and said liquid crystal layer and has a reflective surface on a side of said liquid crystal layer.

15. A liquid crystal display device according to claim 14, wherein said reflective member has a ruggedness the levels of which are different by 0.1 µm to 1.5 µm.

16. A liquid crystal display device according to claim 15, wherein said reflective film is a conductive reflective film and functions as a part of said electrodes.

17. A liquid crystal display device according to claim 15, further comprising a color filter layer on a side of said liquid crystal layer on which said first substrate is provided.

18. A reflective liquid crystal display device comprising: a first substrate; a second substrate; a liquid crystal layer interposed between said first substrate and said second substrate; electrodes for applying a voltage to said liquid crystal layer; a single polarizing plate provided on a side of said liquid crystal layer on which said first substrate is provided; a reflective member provided on a side of said liquid crystal layer on which said second substrate is provided; and an optical compensation member provided between said polarizing plate and said liquid crystal layer, wherein said liquid crystal layer has a twist angle in a range of 220° to 260° and a retardation value in a range of 0.5 µm to 0.8 µm, said optical compensation member has a retardation value in a range of 0.38 µm to 0.43 µm, and an angle β which is formed between a polarization axis direction of said polarizing plate and an alignment direction of liquid crystal molecules in said liquid crystal layer on a side of said polarizing plate, and an angle γ which is formed between an axis direction of a slower optical axis of said optical compensation member and an alignment direction of said liquid crystal molecules, satisfy one of following expressions (H), (I) and (J) when m and n are integers:

$50°+90°n \leq \beta \leq 110°+90°n$, and $-20°+90°m \leq \gamma \leq 10°+90°m$ (H)

$30°+90°n \leq \beta \leq 80°+90°n$, and $20°+180°m \leq \gamma \leq 60°+180°m$ (I)

$70°+90°n \leq \beta \leq 120°+90°n$, and $-75°+180°m \leq \gamma \leq -50°+180°m$ (J).

19. A liquid crystal display device according to claim 18, wherein said reflective member is provided between said first substrate and said liquid crystal layer and has a reflective surface on a side of said liquid crystal layer.

20. A liquid crystal display device according to claim 19, wherein said reflective member has a ruggedness the levels of which are different by 0.1 µm to 1.5 µm.

21. A liquid crystal display device according to claim 20, wherein said reflective film is a conductive reflective film and functions as a part of said electrodes.

22. A liquid crystal display device according to claim 20, further comprising a transparent planation layer formed on said reflective member and planating said ruggedness of said reflective member, and a transparent electrode formed on said planation layer and functioning as a part of said electrodes.

23. A liquid crystal display device according to claim 20, further comprising a color filter layer on a side of said liquid crystal layer on which said first substrate is provided.

24. A reflective liquid crystal display device comprising: a first substrate; a second substrate; a liquid crystal layer interposed between said first substrate and said second substrate; electrodes for applying a voltage to said liquid crystal layer; a single polarizing plate provided on a side of said liquid crystal layer on which said first substrate is provided; a reflective member provided on a side of said liquid crystal layer on which said second substrate is provided; and an optical compensation member provided between said polarizing plate and said liquid crystal layer, wherein said liquid crystal layer has a twist angle in a range of 220° to 260° and a retardation value of 0.5 µm to 0.8 µm, said optical compensation member has a retardation value in a range of 0.25 µm to 0.35 µm, and an angle β which is formed between a polarization axis direction of said polarizing plate and an alignment direction of liquid crystal molecules in said liquid crystal layer on a side of said polarizing plate, and an angle γ which is formed between an axis direction of a slower optical axis of said optical compensation member and an alignment direction of said liquid crystal molecules, satisfy expressions (B1), (B2) and (B3):

$$90°n \leq \beta \leq 90°(+1) \tag{B1}$$

$$-90° \leq \gamma \leq 90° \tag{B2}$$

$$0.5(\beta-90°n)+22.5°m-15° \leq \gamma \leq 0.5(\beta-90°n)+22.5°m+5° \tag{B3}$$

wherein m is an integer selected from the group of −6, −5, −4, 3 and 4, and n is an integer.

25. A liquid crystal display device according to claim 24, wherein said reflective member is provided between said first substrate and said liquid crystal layer and has a reflective surface on a side of said liquid crystal layer.

26. A liquid crystal display device according to claim 25, wherein said reflective member has a ruggedness the levels of which are different by 0.1 μm to 1.5 μm.

27. A liquid crystal display device according to claim 26, wherein said reflective film is a conductive reflective film and functions as a part of said electrodes.

28. A liquid crystal display device according to claim 26, further comprising a transparent planation layer formed on said reflective member and planating said ruggedness of said reflective member, and a transparent electrode formed on said planation layer and functioning as a part of said electrodes.

29. A liquid crystal display device according to claim 26, further comprising a color filter layer on a side of said liquid crystal layer on which said first substrate is provided.

* * * * *

UNITED STATES PATENT AND TRADEMARK OFFICE
CERTIFICATE OF CORRECTION

PATENT NO. : 5,619,356
DATED : April 8, 1997
INVENTOR(S) : Kozo, et al

It is certified that error appears in the above-identified patent and that said Letters Patent is hereby corrected as shown below:

In Claim 13, expression G, please change (G), "$\gamma \leq -50° + 180° m$" to (G) --$\gamma \leq 50° + 180° m$--

Signed and Sealed this

Twenty-eighth Day of April, 1998

Attest:

BRUCE LEHMAN

Attesting Officer     Commissioner of Patents and Trademarks